United States Patent [19]
Blais

[11] 3,985,600
[45] Oct. 12, 1976

[54] METHOD FOR SLITTING A FILM
[75] Inventor: Leo Blais, Shawinigan, Canada
[73] Assignee: Consolidated-Bathurst Limited, Montreal, Canada
[22] Filed: July 9, 1971
[21] Appl. No.: 161,045

[52] U.S. Cl. ................................. 156/229; 83/4; 83/16; 156/251; 156/252; 156/494; 156/497; 156/513; 156/515; 264/154; 264/291; 428/136
[51] Int. Cl.² .......................................... B32B 31/00
[58] Field of Search ............... 264/DIG. 8, DIG. 47, 264/146, 147, 210, 291; 428/136; 225/3–5, 97; 83/4, 15, 16, 30; 156/82, 229, 251, 252, 494, 497, 513, 515, 498

[56] References Cited
UNITED STATES PATENTS

| | | | |
|---|---|---|---|
| 3,300,366 | 1/1967 | Krolik | 428/136 X |
| 3,379,808 | 4/1968 | McIntosh et al. | 264/162 |
| 3,416,772 | 12/1968 | Sheehan | 225/3 |
| 3,428,506 | 2/1969 | Johnstone | 156/148 |
| 3,454,455 | 7/1969 | Rasmussen | 428/136 X |
| 3,503,836 | 3/1970 | Rasmussen | 156/250 |
| 3,536,238 | 10/1970 | Iwama et al. | 225/97 |
| 3,550,826 | 12/1970 | Salmela | 264/146 X |
| 3,596,816 | 8/1971 | Brown | 225/3 X |
| 3,642,967 | 2/1972 | Doll | 428/134 X |
| 3,695,969 | 10/1972 | Highfield et al. | 156/251 |
| 3,851,034 | 11/1974 | Harmon et al. | 264/147 |

OTHER PUBLICATIONS

Zeisberg, M., "Apertured Non–Woven Structure From A Film–Fibril Sheet and Method of Making Same," U.S. Def. Pub. T544,271, 12-24-68.

*Primary Examiner*—William A. Powell

[57] ABSTRACT

A method and apparatus for slitting a moving thermoplastic film. A rotating slitting roll, provided with a plurality of spaced-apart heated blades circumferentially arranged in a pattern, presses the film against a backing member while the film is under tension and in line-contact with the roll. The pressure and heat of the blades fusion-slits the moving film, which may then be stretched to spread the slits and in the case of orientable film to orient the film in the direction of stretch. The slits may be made in either the machine or cross-machine direction. Where continuous slits are made, tapes or ribbons are formed. Where the slits are discontinuous, an aperture film results.

9 Claims, 6 Drawing Figures

INVENTOR
Leo BLAIS

INVENTOR
Leo BLAIS

ATTORNEY

METHOD FOR SLITTING A FILM

BACKGROUND OF THE INVENTION a. Field of the Invention

The present invention relates to slitting thermoplastic films.

More specifically, it relates to slitting a moving, stretchable, thermoplastic film prior to stretching.

b. Description of the Prior Art

Prior art includes many expedients for slitting stationary or moving materials in sheet, web or film form. Such expedients include die presses, rotary slitters, slitter discs, score slitters, slitter knives or blades, and involve such actions as cutting, shearing, perforating, and scoring. The score-cut principle makes use of back-up rolls. Practically all these actions, however, are carried out at ambient temperatures and with moving films the slit is a continuous one in the machine direction.

SUMMARY OF THE INVENTION

It is an object of the present invention to provide a new method and apparatus for slitting films or webs and more particularly to provide a method and apparatus for slitting a moving stretchable thermoplastic film in the cross-direction.

The method and apparatus of the invention employs a heated blade or knife which presses the film to be slit against a backing member while the film is under tension. The pressure and heat of the blade fusion-slits the film following which it may be stretched to spread the slits.

Preferably, the invention employs a rotating slitting roll, including a plurality of spaced-apart heated blades circumferentially arranged, which presses the film to be slit against a backing member, while the film is under tension and in line-contact with the rotating roll, following which the film may be stretched to spread the slits.

According to the invention, a method of slitting a thermoplastic film comprises placing the film under tension, pressing the film with the tip of a heated blade against a backing member while the film is under said tension, the tip of the blade being heated to a temperature higher than the softening range of the film, removing said tip after the tip has penetrated the film.

Generally, the action of the blade is to cut into the film to make an opening without the removal of film material. The opening will have a long (major) axis of any desired length and the short (minor) axis (at right angles to the long axis) will be as short as possible. The ratio of the length of long axis to that of the short axis can, therefore, vary from 1 to infinite. When the ratio is very close to 1, the opening will be very close to a microscopic (elliptically shaped) opening; thus, in all cases the opening will be true slits. While the fusion principle of this invention could be used to produce openings of various shapes e.g. circular, square, rectangular, etc., this is not the preferred use of this principle. The slits or pin holes may be in a staggered or unstaggered configuration and in a variety of patterns. The spacing between the slits will be dependent on the spacing between the blades and for very narrow spacing this in turn will depend on the difficulty of forming many blades close together. It is also possible that the blades could have patterned cutting edges for example, crosses or stars to produce a combination of slits of similar pattern. This would be particularly useful in the case where it was desired to stretch the slitted film to product a bi- or multi-axially oriented film.

The blades can be arranged in various patterns to produce a variety of products. Spaced-apart circular blades can be used to divide the film in the machine direction into tapes or, if the edge of the blades is discontinuous or interrupted, a film with machine direction slits will result. Blades running with their edges parallel to the axis of the roll will produce cross-directional tapes, and discontinuous edges will produce a film with discontinuous cross-sectional slits. Stretching of the film, following discontinuous slitting, will produce an apertured film. If the thermoplastic film is orientable by stretching, stretching the slit film will produce tapes or apertured film oriented in the direction of stretch.

BRIEF DESCRIPTION OF DRAWINGS

The invention will be described in more detail by reference to the following description of a preferred embodiment illustrated in the accompanying drawing and in which.

DESCRIPTION OF PREFERRED EMBODIMENTS

A method and apparatus according to the invention for making discontinuous slits in the cross-direction of a moving film of thermoplastic orientable material will first be described. This particular embodiment is also shown in copending application U.S. Ser. No. 93,646, filed Nov. 30, 1970, now abandoned.

Figure 1:
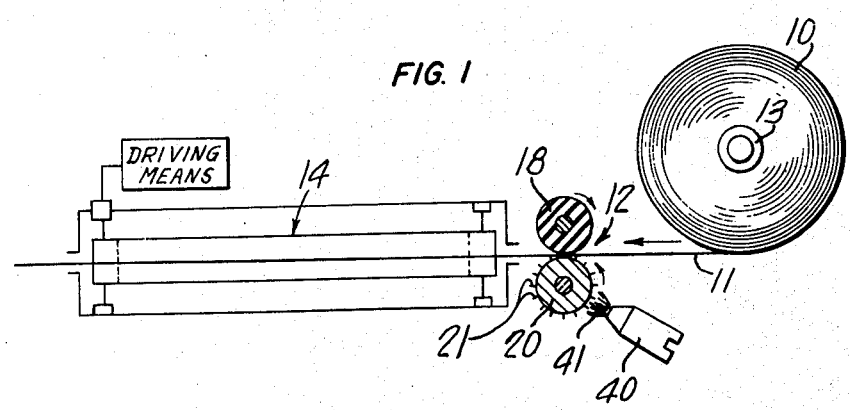
FIG. 1 is a side elevational schematic side elevation of one form of slitting apparatus according to one form of the invention.
Figure 2:
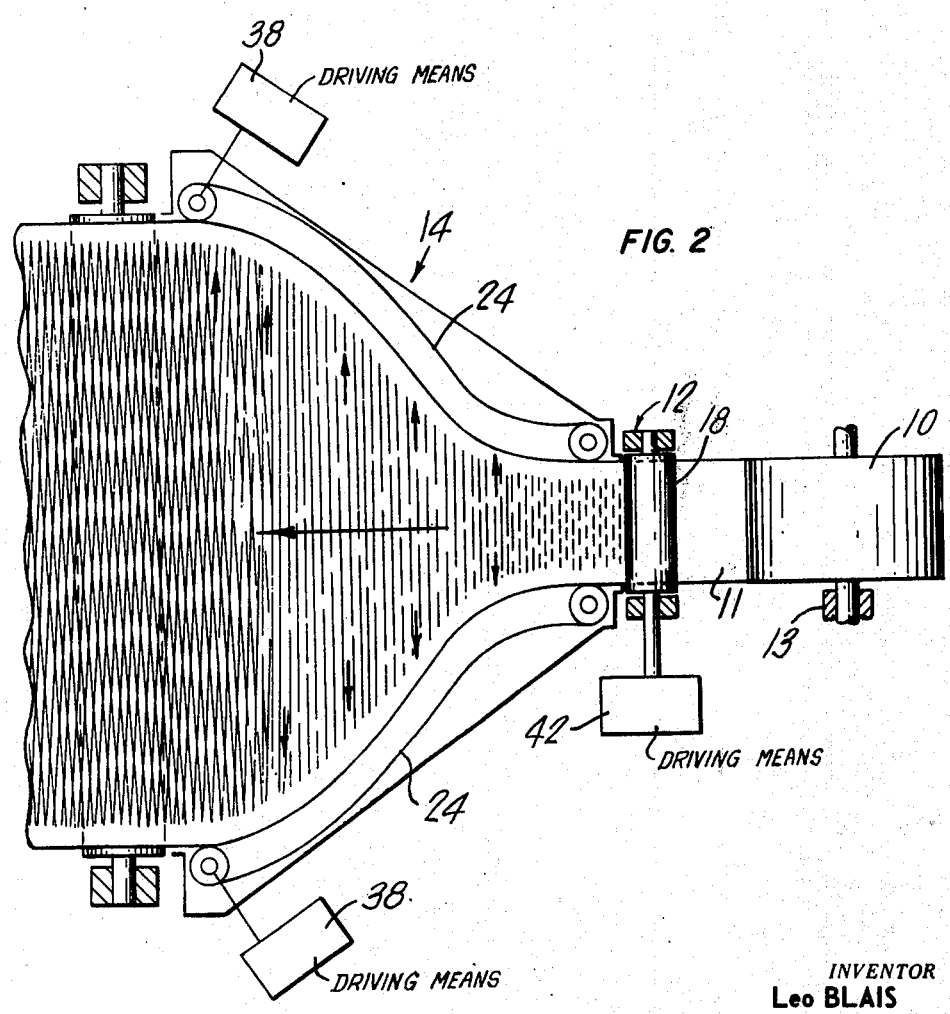
FIG. 2 is a schematic plan view of slitting apparatus according to the invention.

Referring to FIGS. 1 and 2, film 11 is shown passing from a supply roll 10 past a slitting roll 12, and through a tentering apparatus 14. The slitting apparatus has a backing roll 18 against which the slitting roll 20 acts, and a gas burner 40. In FIG. 1, the slitting roll 12 and burner 40 are shown under the backing roll 18. If desired, this relationship can be reversed with the burner always next to the slitting roll or instead of an above-under relationship the slitting and backing rolls may be merely across from each other e.g. where the film was moving vertically.

Figure 3:
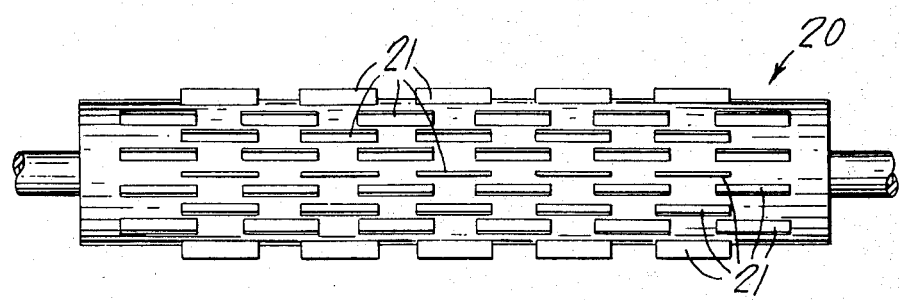
FIG. 3 is an enlarged plan view of a slitting roll provided with a typical arrangement of slitting blades.
Figure 4:
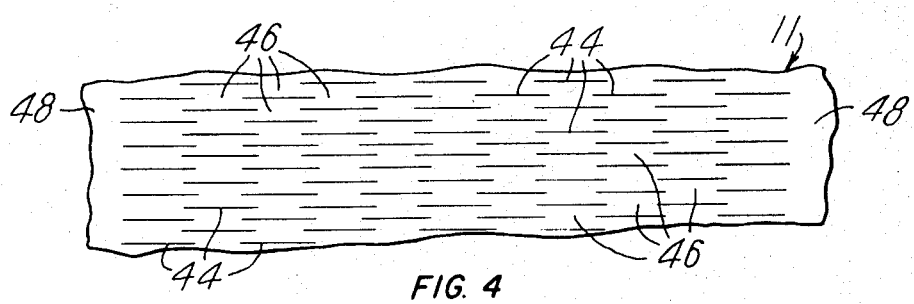
FIG. 4 is a fragmentary plan view showing a piece of slit film resulting from the action of the roll of FIG. 3.

The slitting roll 20 is provided with a plurality of spaced-apart blades 21 circumferentially arranged and staggered in a pattern, as for example shown in FIG. 3, to make a pattern of slits in the film, as shown in FIG. 4.

The tip of blades 21 are of a thin elongated structure, identical to that mentioned above for the nature of the opening or slits that these blades are to produce. They are spaced-apart from each other with their long axis parallel to the axis of rotation of the slitting roll 20 and thus perpendicular to the longitudinal axis of the film 11. This pattern results in discontinuous slits 44 with their long axis in the cross-direction of the film 11. The slit dimensions conform to that of the tips of the blades 21 and the unslit film between slits constitute nodes 46.

The tips of the blades 21 are heated directly by a flame from a gas burner 40.

The stretching of the film is performed by tenter apparatus schematically shown in FIG. 2. This apparatus includes a pair of diverging gripping members, for example, belts. The belts 24 engage the lateral edges of the film 11 and by moving in a diverging path, stretch it laterally. This causes "necking" of the film between the slits 44 as the film is being stretched, and the slits open up leaving spaces 50 between the unslit tapes of film.

Figure 5:
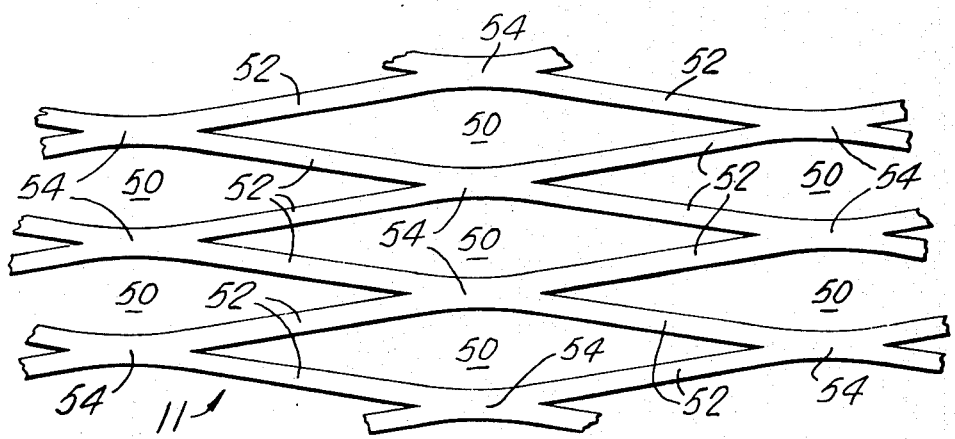
FIG. 5 is a plan view of a product resulting from stretching the film of FIG. 4.

The tentering mechanism performs other functions besides opening up the slits 44. In conjunction with braking mechanism 13, it keeps the film 11 under machine-direction tension and when stretching the film in cross-direction orients the film to increase its tensile strength in that direction. The result of slitting and stretching, as described, is the formation of an open oriented film structure, for example, as shown in FIG. 5. This structure includes a pattern of apertures or holes 50 flanked by elongated oriented ribbons 52 interconnected at node points 54 formed from the nodes 46 of the slit, of unstretched film. The openings 50 are formed due, as mentioned, to the elongation and necking down of the ribbons 52 defined by the slits 44 during the tentering.

In applications where orientation is of secondary importance or non-existent, the lateral stretching would be carried out only to that point where the desired opening in the slit has been achieved. With most films, stretching to spread the slits is usually best done at ambient or lower temperatures so that any points of fusion joining the sides of the slits will part more readily.

In the above embodiment, where film orientation is desired, depending upon the polymer used, it may be necessary to conduct the stretching operation at elevated temperature. While in the above embodiment, the slitting apparatus 12 has been shown immediately preceding the tentering apparatus 14, it is apparent that the film 11 may be pre-slit prior to stretching, and that the stretching operation may follow after a lapse of time. It is also possible that the stretching be carried out in a quite separate operation removed from the slitting. In that case, tension may be necessary to avoid wrinkling of the film and to maintain a uniform slitting pattern during the slitting operation. Tension may be provided by suitable braking means for the unwind roll of the unslit film and suitable driving means for the wind-up roll of the slit film. Where the proper relationship between the braking and driving means is not feasible or availble for maintaining the proper film slitting tension, this tension may be provided otherwise. This may be accomplished, for example, by feeding the film through a pair of driven nip rolls prior to slitting and through a similar pair of driven nip rolls after slitting, with the rolls after slitting running at a speed slightly higher than that of the rolls prior to slitting. The slitting apparatus 12 may also be located within the tenter 14 so that the film is under both machine and cross-machine tension while being slit. Where the making of a particular product does not require the relatively elaborate tenter, as for the above, a smaller simplified tentering apparatus may provide the necessary tension.

The mechanisms of the invention may be driven by any suitable means, as, for example, by drive means illustrated at 38 for the tentering apparatus 14 and drive means 42 for the slitting apparatus 12.

It is also possible to extend the slits transversely, substantially the full width of the film, by using blade elements 21 which extend continuously across the roll 20 the required length. The resulting film is made up of a structure having a plurality of laterally extending tapes or ribbons interconnected at their opposite ends by unslit margins 48, which are those areas of the film ends gripped by the tenter gripping belts 24.

To make tapes or ribbons in the machine or longitudinal direction of the film, blade or knife elements whose tips are arranged in concentric circles about the rotational or longitudinal axis of the slitting roll can be used. By breaking these circular elements into sections, discontinuous slits can be made having their long axis in the machine direction. The tentering apparatus 14 of the above embodiment would be replaced by one which would stretch the film in the longitudinal or machine direction. To maintain the proper slitting tension, the above-mentioned method of using nip rolls can be used. As with lateral stretching, the sides of the slit separate, and openings between the tapes or ribbon grow as the film strip necks down or contracts as the film stretches. In the embodiment involving continuous longitudinal tapes, and in the situation where minimum stretching is involved, the separation of the sides of the slits may be assisted by special parting blades or elements passing through the slits after the slit film leaves the slitting apparatus. Where necking of the film does not take place sufficiently to separate the sides of the slit, such separation may be effected by stretching or spreading the film in a direction at right angles to the long axis of the slit. Units known as spreader rolls can effect such a separation.

In the preferred embodiments of the invention shown, the tips of the blades of the slitting roll are heated directly by an open gas flame 41 from the burner 40. In other embodiments, the tips could be heated in a number of other ways, using, for example, electricity, infra-red radiation, internal circulation of hot liquids or steam within the blade elements or slitting rolls or in other ways. For optimum efficiency, the heating of the blade tips and the pressure of the back-up roll against these tips should be independently controllable and variable so that the best combination of blade-tip temperature and back-up roll pressure can be selected for each type of thickness of film and production rate. Arranging the blades so that they are a part of the resistance in an electric circuit could provide such a control.

The operating temperature of the blade tips should not be so far above the melting point of the film that after the tip penetrates and leaves the film the sides of the slit tend to fuse together unduly. In fact, for a film with a wide softening temperature range, the tip temperature can, with the appropriate back-up roll pressure, be somewhat below the actual melting point of the film. In general, the tip temperature should be at least as high as the softening range of the film and will depend on such factors as the heat of fusion of the polymer, the peripheral speed, heat capacity of the blades, etc. The more the temperature exceeds the softening point of the film material, the greater the potential production rate, among other advantages. However, under this condition, there will be a greater tendency for the sides of the slits to stick together after the slit has been made. The stretching step is useful in overcoming this stickiness and separating the sides of the slits. For films that tear easily, use of the higher temperatures tends to seal off any cracks in the sides or ends of the slits and thereby prevents tearing.

For temperatures above the melting point of the film, the slitting action is largely one of fusion. For temperatures below the melting point, the action is a combination of pressure (scoring) and fusion. To distinguish this slitting action from the more mechanical prior art actions, it may be referred to as "fusion-slitting".

Where closely spaced slits are required, instead of packing the blades closely together in one slitting roll, the slitting operation may be carried out with two (or more) rolls. In this case, the second roll would be synchronized with the first roll so that it would fusion-cut slits in between the slits made by the first roll.

The material which is best for the blade tips will depend on a number of factors, such as the method of heating the tips, the type of film, surface of the back-up roll, among others. Preferably, they should be of wear-resistant material to avoid undue wear and change in dimensions. Heating the tips makes it possible to use duller tips so the use of tips which are too sharp may be avoided. On the other hand, closely packed rows of slits will require quite sharp tips. The tip material should be selected to minimize any tendency for the tip to adhere to the film after it has penetrated the film. A steel roll with the blades machined into the periphery of the roll and the tips chrome-plated has been found to work satisfactorily with polyethylene and polypropylene films. A wedge-shaped tip has been found to be effective.

The invention will be further illustrated in greater detail by the following specific examples, setting out preferred procedures.

EXAMPLE 1

An unoriented linear polypropylene film 9 inches wide and 2 mils thick is fed under a tension of approximately one-half lb. per inch through a slitting apparatus of the type shown in FIG. 1 at 42 feet per minute. The slitting pattern is as follows: slit length - 5/32 inches; distance between slits in same row - 1/32; distance between slit rows - 1/16. The temperature at the base of the wedgeshaped blades is approximately 375° F. and the surface of the back-up roll is polyurethane with a shore hardness of 25D.

The slit film is stretched in the transverse (cross) direction in a tenter at a draw ratio of 9:1 to orient the film in a cross-direction. The resulting product is an apertured oriented film, with the length of the aperture approximately 1⅛ inches, its width at the widest point approximately 0.10 inches, and the average width of the ribbons approximately 0.02 inches.

EXAMPLE 2

An unoriented nylon film 8 inches wide and 3 mils thick is fed through the slitting apparatus at 40 feet per minute. The slitting pattern is: length - 5/16; distance between slits - 1/16; distance between rows - ⅛. The temperature at base of blades is 500° F, and surface of back-up roll is polyurethane having a shore hardness of 42D.

The slit film is stretched transversely at a draw ratio of 3:1. The resulting product is an apertured film similar to that of Example 1, but with dimensions corresponding to the new draw ratio, i.e., the length of the aperture would be three times the original slit length, and the ribbon would neck down in proportion to the square root of the draw ratio.

EXAMPLE 3

Example 1 is repeated using a polyurethane back-up roll surface having a shore hardness of 42D. The temperature is 425° F.

EXAMPLE 4

Example 1 is repeated using: a back-up roll surface made of material sold under the trademark "Rubco"; a film thickness of 6 mils; temperature 420° F.; feed rate of 58 feet/min.

For best service, the surface of the back-up roll (or its covering) should preferably be resilient, heat resistant and relatively soft compared to the surface of the blade tips. A metal surface (e.g. brass) would work, but it would tend to reduce the sharpness and shape of the blade tips.

In the above examples, while urethane has excellent wear properties, its heat resistance is not sufficient for the fusion-slitting of some of the higher-melting point polymers. To protect its surface from heat (in these examples) the underside of the back-up roll revolved in a waterbath. A release agent (e.g., soap) was added to the water to assist in separating the blade tips from the film.

Examples of materials which can be used for the surface of the back-up roll are as follows: Hard rubbers particularly those having heat resistance (e.g. silicone rubber; fluorocarbon rubbers), one such hard rubber is "Devcon Flexane" manufactured by Devcon Corporation; resin impregnated fabrics such as Rubco (see Example 4) manufactured by Anchor Packaging; polymers similar to the films themselves, but having higher melting points (or similar melting points if they are cooled) e.g. polyvinylidene chloride ("Hynar" manufactured by Westlake Plastics), teflon, urethane, nylon etc.

The velocity at which the slitting and back-up rolls are run will depend on a number of factors, e.g., rate of product desired, attainable tip temperatures, thickness and type of film etc., suitable linear velocities which have been found to be satisfactory are 300, 600 and 1000 feet/min. but greater velocities are possible and, of course, slower velocities might be used although these may be less desirable because of economic considerations. The size of these rolls will also depend on known engineering considerations.

Figure 6:
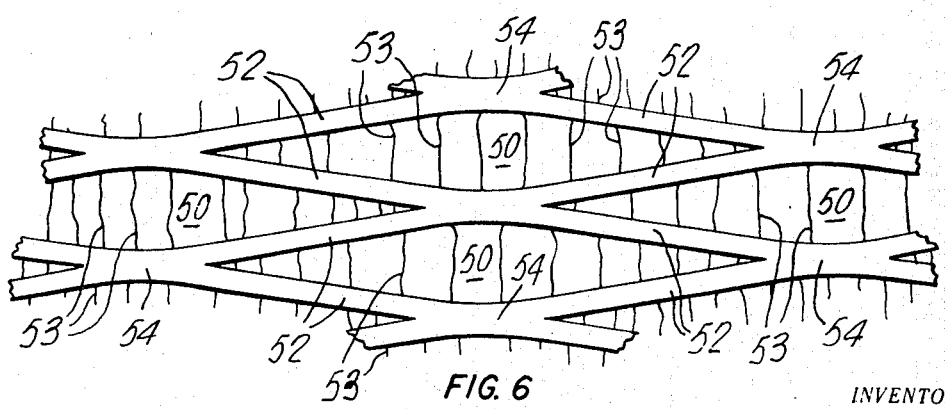
FIG. 6 is a plan view of another product resulting from slitting and stretching the film of FIG. 4 under different conditions.

As mentioned, the method of the invention can be used to produce a variety of products. Tapes or apertured film has been suggested and as the above embodiment indicates, these may be oriented for greater tensile strength. In addition, by a choice of tip temperature and stretching temperature, the sides of the slits can be made to adhere at a number of point contacts so that on stretching these points of fusion will produce thin filaments connecting one side of the aperture to the other. These points of fusion can be encouraged through the use of blades having a roughened or slightly irregular tip. Such a product is shown in FIG. 6, where on spreading the slits, filaments 53 are formed.

In the case of continuous slits, the tapes formed would be interconnected by these thin filaments. In the above examples, three polymeric materials were mentioned; others can be used, e.g. other polyolefins and polyamides; halogenated polymers (e.g., polyvinylchloride; fluorocarbons; polytetrafluoroethylene etc.); polyesters; polystyrene; polyvinyls (e.g., polyvinyl alcohol); thermoplastic urethanes; and various copolymers of the monomers of the polymers above.

Other embodiments of the above invention are also possible, for example, the heated blade elements may be arranged on a flat surface in the form of a plate. The plate is pressed against film held against the blade tips by a suitable flat backing member while the film is held under tension. As soon as the tips have penetrated the film, they are removed.

The blades too may be arranged in any number of ways, for example, they could be staggered as shown in FIG. 3 or in rows; the axis of the slits could be parallel to the direction of stretch. The slits may also be superimposed on each other, e.g., at right angles to each other in the form of a cross and these may be arranged in rows.

The slitting operation of this invention may be carried out before the stretching step, or between various stretching steps or after the stretching step. The stretching (orienting operation) may involve stretching first in one direction and then in another or stretching in both directions at the same time commonly referred to as biaxial stretching. The fusion slitting and orientation steps may also be combined with a fibrillation step; here, the continuous or discontinuous tapes could be fibrillated by conventional methods after orientation.

The arrangement of the blade tips or slits taken in combination with variations in the order in which the slitting and stretching steps are carried out can lead to a wide variety of products from this invention. Some of these have already been mentioned. The attached table lists these and several in one.

The above monofilm products can also be made on a bifilm or multifilm basis by combining one film with another prior to the slitting operation. In such cases, it has been found that the fusion-slitting step has special advantages. One of these is that for situations where one film has a lower melting point, then the lower melting one has a tendency not to stay as a uniform layer on the other, but to form "pools" of polymer because of low adhesion and high surface tension; in these cases, the fusion steps tend to tie down this lower melting point material and keep it in place. This aspect is disclosed in a copending application.

TABLE OF PRODUCTS

| | ARRANGEMENT OF SLITS | DIRECTION OF STRETCHING | PRODUCT |
|---|---|---|---|
| A. | Staggered with the long axis of the slits in the direction in which the film is to be stretched or at some angle to this direction, e.g., arranged as shown in FIG. 3; or some arrangement with slits at an angle, etc. e.g. 45° angle. | Longitudinal or lateral | Apertured or fibrillated film with the long axis of the aperture in the direction of the stretch. If the polymer is orientable by stretching, the tenacity of the product will be higher than it would be without stretching in the direction in which it had been stretched. |
| B. | In regular rows with slits parallel to each other and the long axis as for arrangement A as above. | Longitudinal or lateral | Similar to that for A above |
| C. | Superimposed slits e.g. + or X arranged as for A or B above but preferably as for B | Longitudinal followed by a lateral stretching or a stretching in both directions at the same time | Apertured film with a scrim-like appearance and apertures much larger and less oblong than those for A or B above |
| D. | Similar to A or B above | Similar to that for C | Apertured film similar to C above with apertures more irregular |

I claim:

1. A method for the continuous production of an apertured sheet of a thermoplastic polymeric material comprising
   a. providing a slitting means comprising a rotatable slitting roll and a backing roll having their longitudinal axes parallel; said rolls being spaced to provide a nip therebetween, said slitting roll having a plurality of spaced apart slitting blades extending from the circumferential surface of said slitting roll, said backing roll having a heat resistant, resilient circumferential surface,
   b. heating said slitting blades such that at least the cutting edges have a temperature above the softening temperature range of said thermoplastic polymeric material,
   c. feeding an unoriented film of said thermoplastic polymeric material under tension through said nip,
   d. pressing the film in said nip against said backing roll with the heated cutting edges of said blades, whereby said blades penetrate and fusion-cut corresponding slits in said film, and
   e. stretching said film such that the resulting slits open to form apertures.

2. A method according to claim 1 in which two or more rotatable slitting rolls are used to slit the film, the rolls being arranged so that the slits formed by one slitting roll are between those of another cell.

3. A method according to claim 1, in which in step d) the film is slit to form a plurality of spaced apart slits extending in the lateral direction of said film and in step (e) the stretching is in said lateral direction to orient said film in the lateral direction.

4. A method according to claim 1, in which in step d) the film is slit to form a plurality of spaced apart slits extending in the longitudinal direction of said film and in step e) the stretching is in said longitudinal direction to orient said film in the longitudinal direction.

5. A method according to claim 1 wherein said heating in step b) comprises applying a gas flame directly to said blades.

6. A method according to claim 1 in which the film is stretched at temperature higher than the ambient temperature.

7. A method according to claim 6 in which the temperature of the cutting edges and of the film is such that the sides of the slits adhere to each other forming points of adhesion along said sides and that on stretching to separate said sides, the points of adhesion form thin filaments which bridge the opening formed by the separation of said sides.

8. A method of slitting a moving thermoplastic film according to claim 1 in which the backing roller is a rotatable roller, and the roller is cooled by passing the underside of the roll through a coolant.

9. A method according to claim 8 in which the underside of the roll is passed through a medium containing a release agent and picks up the release agent, the release agent picked up by the roll thus assisting in the separation of the blade tips from the film.

* * * * *